United States Patent [19]
DiOrio

[11] Patent Number: 5,956,899
[45] Date of Patent: Sep. 28, 1999

[54] APPARATUS AND METHOD FOR SUBIRRIGATING PLANTS

[76] Inventor: James J. DiOrio, S3 W3 1963 Mary Ct., Delafield, Wis. 53018

[21] Appl. No.: 09/128,793

[22] Filed: Aug. 4, 1998

[51] Int. Cl.[6] .................................................. A01G 25/00
[52] U.S. Cl. .................................................. 47/80; 47/79
[58] Field of Search ................................. 47/79, 80, 81, 47/48.5

[56] References Cited

U.S. PATENT DOCUMENTS

| | | | |
|---|---|---|---|
| 3,069,807 | 12/1962 | Wall | 47/79 |
| 3,856,205 | 12/1974 | Rohling | 239/63 |
| 4,038,780 | 8/1977 | Bruno | 47/63 |
| 4,148,155 | 4/1979 | Allen | 47/59 |
| 4,321,937 | 3/1982 | Littlehale | 137/78.3 |
| 4,329,815 | 5/1982 | Secrest | 47/80 |
| 4,447,983 | 5/1984 | Shinada | 47/48.5 |
| 4,578,897 | 4/1986 | Pazar et al. | 47/48.5 |
| 4,745,707 | 5/1988 | Newby | 47/79 |
| 4,782,627 | 11/1988 | Hauk | 47/81 |
| 4,885,870 | 12/1989 | Fong | 47/79 |
| 4,993,176 | 2/1991 | Spinosa | 47/40.5 |
| 4,999,947 | 3/1991 | Whitaker | 47/81 |
| 5,046,282 | 9/1991 | Whitaker | 47/79 |
| 5,097,626 | 3/1992 | Mordoch | 47/79 |
| 5,113,888 | 5/1992 | Beggs | 137/1 |
| 5,259,142 | 11/1993 | Sax | 47/48.5 |
| 5,272,835 | 12/1993 | Stern | 47/79 |
| 5,440,835 | 8/1995 | Romo | 47/48.5 |
| 5,813,605 | 9/1998 | Chou | 239/64 |

FOREIGN PATENT DOCUMENTS

| | | | |
|---|---|---|---|
| 300377 | 1/1989 | European Pat. Off. | 47/79 V |
| 883263 | 6/1943 | France | 47/48.5 |
| 2608011 | 6/1988 | France | 47/79 V |
| 2609862 | 7/1988 | France | 47/79 V |
| 2683121 | 5/1993 | France | 47/79 V |
| 1039296 | 3/1957 | Germany | 47/48.5 |
| 1151974 | 7/1963 | Germany | 47/48.5 |
| 293709 | 9/1991 | Germany | 47/79 V |
| 82216 | 4/1986 | Japan | 47/79 C |
| 40/6303860 | 11/1994 | Japan | 47/48.5 |
| 2250171 | 6/1992 | United Kingdom | 47/79 V |
| WO 91/07870 | 6/1991 | WIPO | 47/48.5 |

*Primary Examiner*—Michael J. Carone
*Assistant Examiner*—Fredrick T. French, III
*Attorney, Agent, or Firm*—Andrus, Sceales, Starke & Sawall

[57] ABSTRACT

A self-watering plant device has a reservoir for retaining liquid therein. The reservoir is provided with a venting tube having one end attached to the reservoir and another end carrying a sensing device placed in the soil surrounding the plant for detecting the moisture level therein. The reservoir is further provided with an outlet tube for delivering liquid to the plant in response to the sensing device. The invention is improved such that the venting tube is flexibly displaced so that the sensing device is variably and selectively positioned at different height levels in the soil so as to establish the degree of wetness and dryness in the soil. The outlet tube is installed in the soil adjacent the bottom wall of a pot housing the plant to directly deliver a free flow of liquid to a bottom portion of the plant in response to the moisture level detected by the sensing device.

18 Claims, 4 Drawing Sheets

APPARATUS AND METHOD FOR SUBIRRIGATING PLANTS

The invention relates generally to automatic irrigation systems for soil-based plants and, more particularly, pertains to an irrigation system which constantly regulates soil moisture conditions for a particular plant.

BACKGROUND OF THE INVENTION

Many systems have been devised which deal with control of watering and feeding plants, particularly those of a potted or container-bound variety. One well known type of irrigation system operates on a vacuum pressure release principle wherein water and/or other liquid will not flow by gravity from an air tight receptacle unless air is admitted thereto. Then, when a liquid level drops to the bottom of an air or sensor tube depending from the receptacle, air is permitted to pass up into the receptacle and liquid is discharged from the tube or other means until the level of liquid covers the bottom end of the air or sensor tube thereby shutting off the flow of air and liquid.

Prior plant irrigation systems employing the above described vacuum pressure release principle have generally been inadequate for several reasons. For example, most automatic plant watering systems provide a drop-wise discharge of water and/or other liquid nutrient from above the soil level of the potted plant. Such top watering designs have been found to provide uneven drip-type irrigation to the roots of the potted plant. In addition, watering the potted plant from above has a tendency to push toxic residues in the soil down into the root zone which can cause plant growth problems.

One example of such a system described above is disclosed in U.S. Pat. No. 3,856,205 issued Dec. 24, 1974 to Rohling. Another similar design is shown in U.S. Pat. No. 4,321,937 issued Mar. 30, 1982 to Littlehale. This latter system recognizes that various types of sensors or control elements may be utilized at the bottom of a rigid sensor tube to detect the moisture requirements for a particular plant. However, it is noted that due to the rigidity of the sensor tube, the sensor remains at a particular location within the soil which limits the effectiveness of the irrigation. A further example of a prior art top watering, drip system is set forth in U.S. Pat. No. 4,578,897 issued Apr. 1, 1986 to Pazar et al. This system suffers additionally from disposing the bottom of the plant in a standing pool of water which is conducive to rotting of the roots. Another type of system, in the form of a valve, for regulating irrigation to plants based on soil moisture requirements is described in U.S. Pat. No. 5,113,888 issued May 19, 1992 to Beggs. Instead of using a vacuum, this valve relies upon positive air exit pressure to periodically deliver water to a spray head above the soil so that this device suffers the same top watering control problems as discussed above.

Such predecessor systems have not proved entirely effective and convenient to use, and it remains desirable to provide a plant subirrigation or bottom watering system which selectively transports a free, yet manageable, flow of liquid directly to the plant root zone so as to insure stronger, more vigorous plants. It is also desirable to provide a plant subirrigation system which is more versatile in adjusting the degree of wetness or dryness for a particular plant. It is further desirable to provide a subirrigation system which can be easily installed and simply used with any potted plant, requires no assembly and generally avoids the problems of the prior art systems as set forth previously.

SUMMARY OF THE INVENTION

The inventive apparatus and method for subirrigating potted plants advantageously provides a plant maintenance and nurturing arrangement characterized by simplicity in structure and operation, controllability in regulating the proper liquid feeding rate for a specific plant, and versatility in use for various plant pots.

It is one object of the present invention to provide a subirrigation apparatus for self watering a potted plant from the bottom thereof. It is another object of the present invention to provide a subirrigation apparatus which automatically regulates soil moisture conditions for a particular plant. It is also an object of the present invention to provide a subirrigation apparatus for supplying water and/or nutrient liquid to a plant in a dispersed manner such that the plant will not sit in a pool of liquid. Another object of the present invention is to provide an arrangement which will conveniently convert any potted plant to a subirrigation system without transplanting the plant. Yet another object of the present invention is to provide a subirrigation apparatus which may be variously mounted inside or outside of a plant pot. Still another object of the present invention is to provide a subirrigation system which is easily installed and/or removed for cleaning and moving.

In one aspect of the invention, a plant subirrigation apparatus is provided for self-watering a soil-based live plant directly from the bottom thereof. The apparatus includes a closed reservoir having a bottom surface, a top surface and a side wall structure for retaining liquid therein. The top surface is provided with an elongated venting tube having a proximal end removably fastened to the top surface and a distal end embedded in the soil of a plant pot. The distal end carries a sensor responsive to the level of moisture in the plant pot soil with the sensor being positioned at various levels in the soil controlling the degree of wetness and dryness therein. The sidewall structure is formed with an outlet tube disposed in the soil adjacent the bottom wall of the plant pot. The reservoir is filled with liquid and is mounted in the vicinity of the plant pot such that when the soil of the plant pot becomes dry, air will pass through the sensor to the proximal end of the venting tube enabling liquid to free flow through the outlet tube into a lower portion of the soil thereby subirrigating the plant. When the soil in the plant pot becomes moist, the sensor will prohibit air from flowing therethrough and to the proximal end of the venting tube preventing liquid from free flowing through the outlet tube into the lower portion of the soil. The reservoir is formed of the least translucent material so that the liquid level therein can be visually monitored at all times. The side wall structure of the reservoir is provided with a set of hooks engageable with the side wall of the plant pot. The venting tube is flexible enabling the sensor to be variously positioned in the plant pot. The proximal end of the venting tube carries a plug which is sealingly engageable with the wall forming an opening in the top surface to make the reservoir air tight. The sensor is preferably comprised of a porous filter material. The reservoir is mounted either inside the side wall of the plant pot, outside the side wall of the plant pot or on a supporting surface above the plant pot. The outlet tube is provided with a one-way check valve to prevent back flow of air and liquid into the reservoir. The placement of the sensor in an upper portion of the plant pot soil will provide wetter conditions, and the placement of the sensor in the lower portion of the plant pot will provide drier conditions. The side wall structure of the reservoir includes a contoured surface which is in mating relationship with the plant pot side wall when the reservoir is mounted in relation thereto. The liquid is comprised of water per se or a combination of water and a fertilizing agent.

In another aspect of the invention a self watering potted plant device has a reservoir for retaining liquid therein. The reservoir is provided with a venting tube having one end attached to the reservoir and another end carrying a sensing device placed in the soil surrounding the plant for detecting the moisture level therein. The reservoir is also provided with an outlet tube for delivering liquid to the plant in response to the sensing device. The invention is improved such that the venting tube is flexibly displaced so that the sensing device is variably and selectively positioned at different height levels of the soil so as to establish a degree of wetness and dryness in the soil. In addition, an outlet tube is installed in the soil adjacent the bottom wall of the pot housing the plant to directly deliver a free flow of liquid to a bottom portion of the plant in response to the moisture level detected by the sensing device. The reservoir is held stationary when the sensor device is varied in position.

The invention also contemplates a method of subirrigating a plant pot having a bottom wall and a side wall for housing a soil-based live plant therein. The method includes the steps of providing a reservoir having a bottom surface, a top surface and side wall structure for retaining liquid therein, the reservoir having an elongated venting tube with one end removably fastened to a top surface of the reservoir and another end having a sensing device embedded in the soil surrounding the plant, the reservoir also having an outlet tube for selectively delivering liquid in the reservoir to the soil; installing the outlet tube adjacent the bottom wall of the plant pot such that the liquid from the reservoir is directly delivered to the bottom of the plant in response to a moisture level detected by the sensing device; and positioning the sensing device at a desired level in the soil.

Various other features, objects and advantages of the invention will be made apparent from the following description taken together with the drawings.

BRIEF DESCRIPTION OF THE DRAWINGS

The drawings illustrate the best mode presently contemplated in carrying out the invention.

In the drawings.

DETAILED DESCRIPTION OF THE INVENTION

Figure 1:
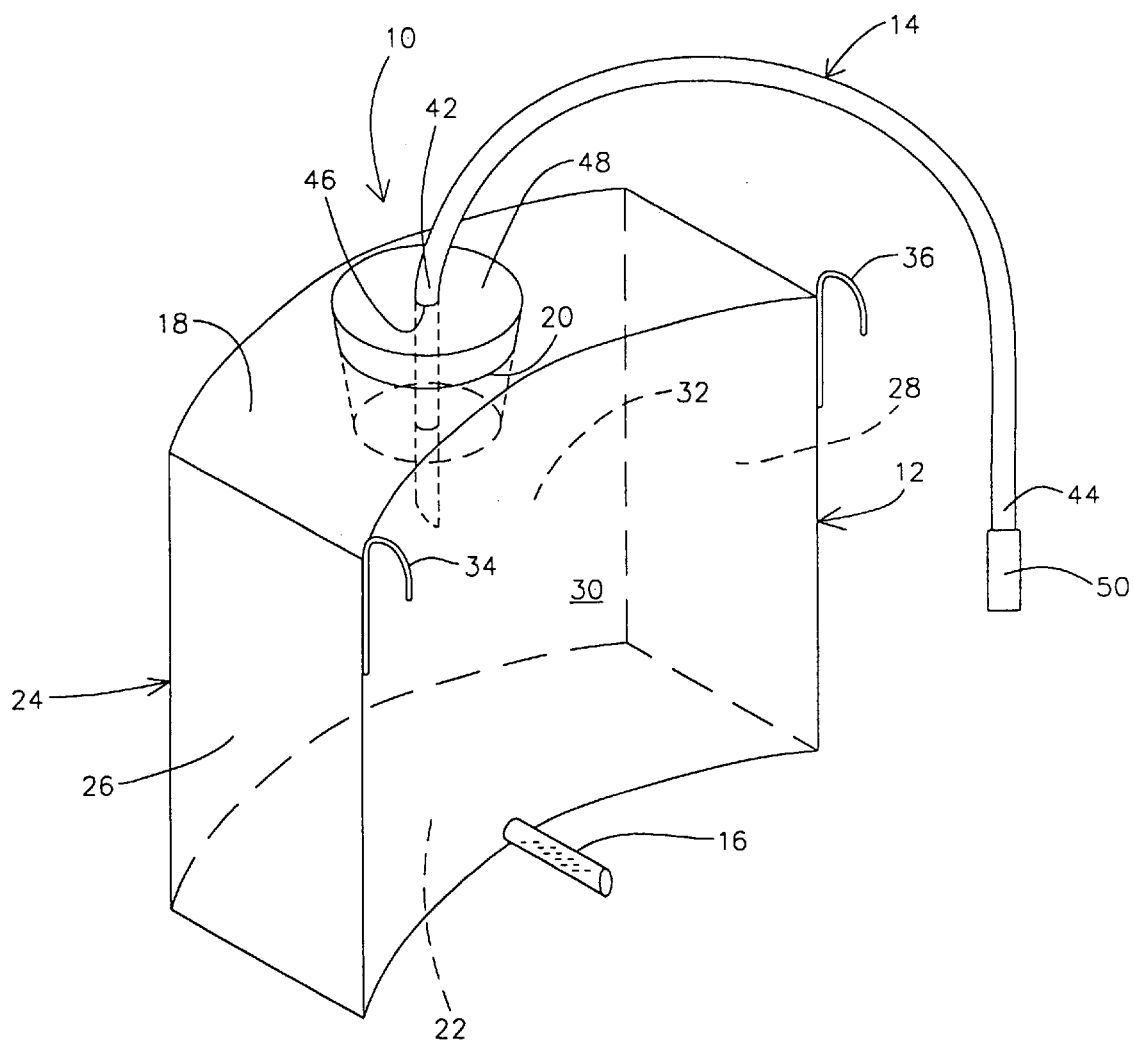
FIG. 1 is a perspective view of a plant subirrigation apparatus embodying the present invention.

Referring now to the drawings, an apparatus for subirrigating plant pots is generally defined by the reference numeral 10, as shown in FIG. 1. Apparatus 10 is comprised of a reservoir 12 for holding a supply of liquid therein, a vent tube 14 for signaling a particular moisture condition in an associated plant and an outlet tube 16 for selectively delivering a stream of liquid to maintain and nurture the plant.

Figure 2:
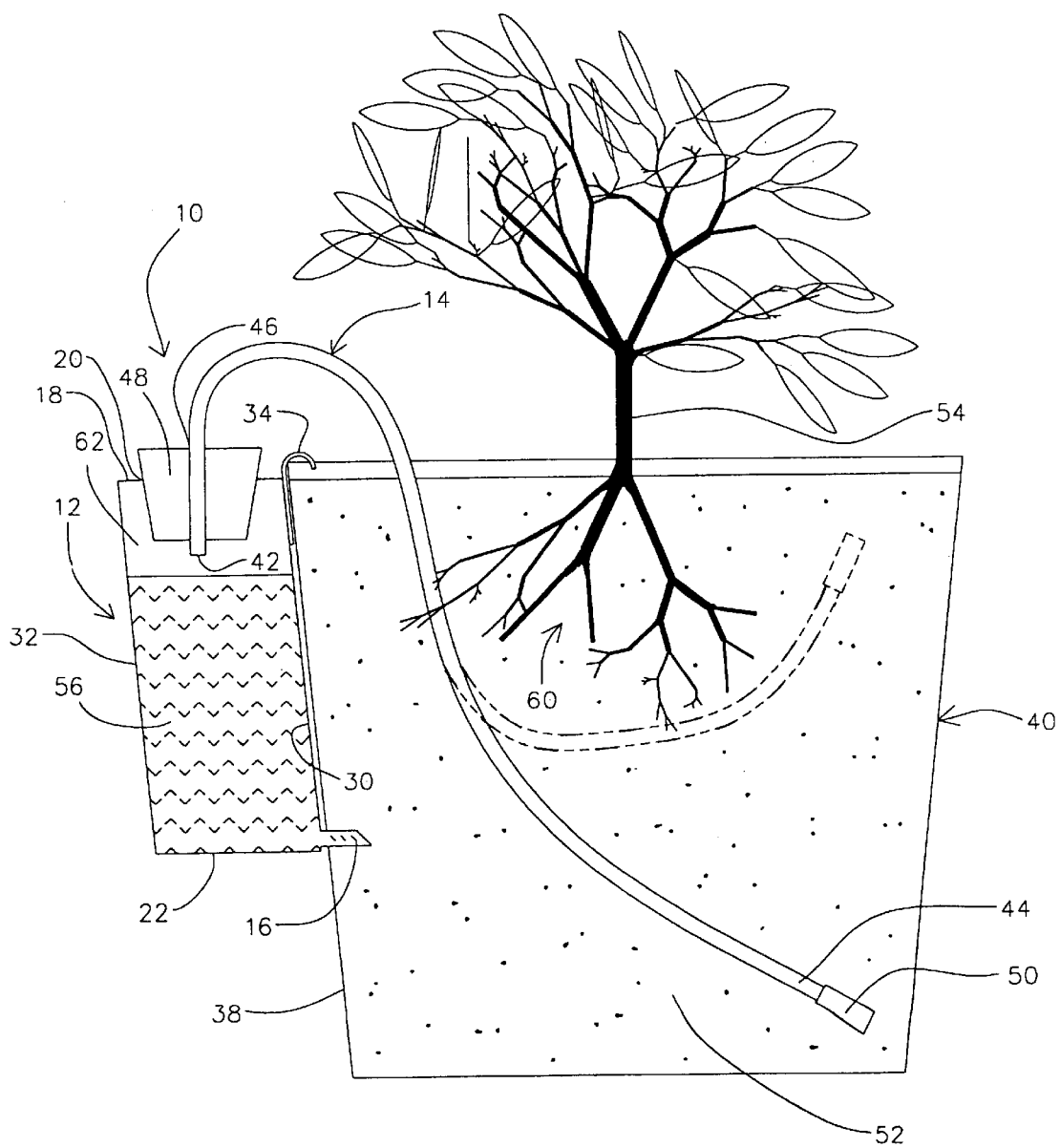
FIG. 2 is an elevational view with parts broken away showing the subirrigation apparatus in FIG. 1 as assembled for use on the outside of a plant pot.

Reservoir 12 is preferably constructed of a rigid, clear plastic or at least a translucent material such as styrene resin, polyethylene, polypropylene or the like which enables visual monitoring of the liquid level therein. The structural make up of reservoir 12 includes a top wall 18 having a fill opening 20 formed therein, a bottom wall 22 and a side wall structure 24. In the preferred embodiment of FIG. 1, side wall structure 24 is defined by a pair of opposed end walls 26, 28 as well as a concavely-shaped inner wall 30 and a convexly-shaped outer wall 32. A pair of support hooks 34, 36 project upwardly from inner wall 30 to enable an aesthetic mounting of reservoir 12 to a complementary shaped exterior wall 38 of a plant pot 40 as represented in FIG. 2. It should be appreciated that reservoir 12 may vary as desired in size or shape without departing from the scope of the invention.

Vent tube 14 has an open proximal end 42 and open distal end 44, and is comprised of commercially available plastic, (e.g. vinyl) flexible tubing having a length typically in the 1 inch to 12 inch range and an inside diameter of anywhere from ⅛ inch to ½ inch but is not necessarily limited thereto. Like reservoir 12, it may be desirable to use a transparent or translucent material which allows for a quick visual inspection of a portion of vent tube 14 in its installed condition as well be appreciated hereafter. As seen in FIG. 2, proximal end 42 is frictionally engaged by a wall defining a through opening 46 formed in a frustro-conically-shaped rubber plug 48 and depends slightly below the bottom surface thereof. Plug 48 is adapted to be removably fastened in the fill opening 20 in reservoir top wall 18 so as to make reservoir 12 air tight once the reservoir has been filled. Distal end 44 is provided with a commercially available, removable porous moisture sensor 50 which is preferably ceramic but may also be fabricated from, but is not limited to, polyethylene, sandstone or the like. Sensor 50 is formed with a number of fine through passages which selectively allow and prevent the passage of air in the soil through the vent tube 14 depending on the current moisture conditions thereof. It will be appreciated that the placement of sensor 50 on the distal end 44 of vent tube 14 allows the sensor 50 to be placed at different heights or levels within the soil 52 surrounding the planted pot 40 without disturbing the position of the reservoir 12 so as to vary the wetness or dryness of the soil 52 as desired for a particular plant 54. In this manner, it is not necessary to change the type of sensor 50 inserted in the vent tube distal end 44 although the invention allows for such feature.

Figure 3:
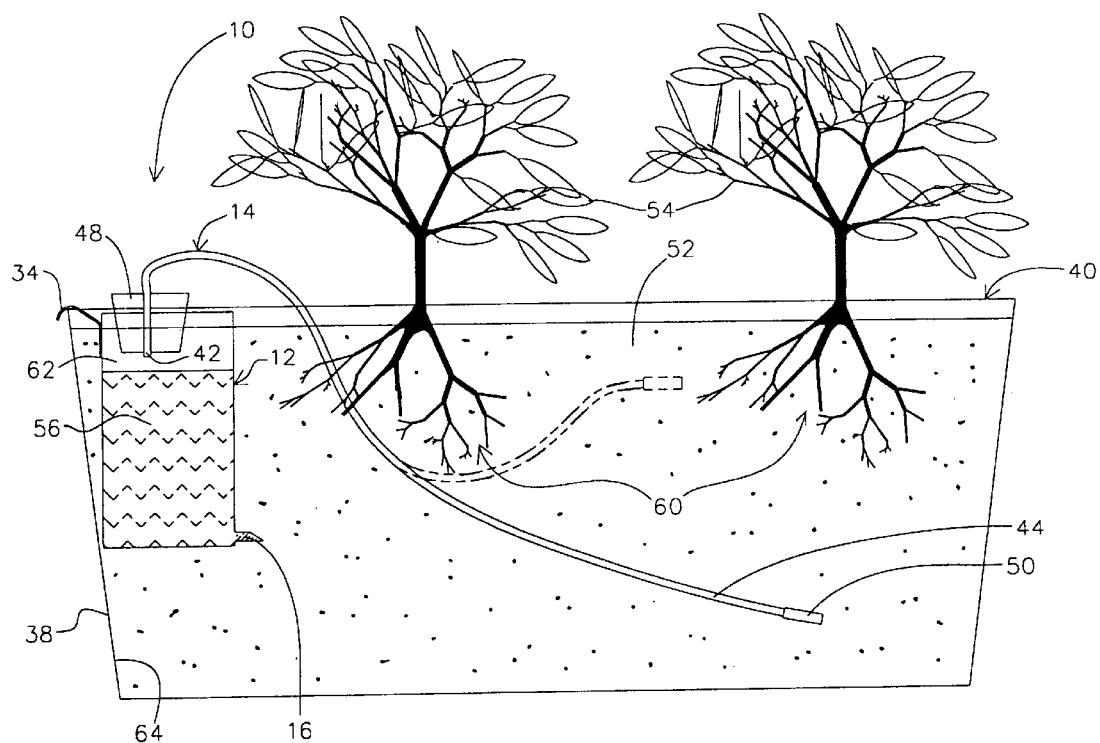
FIG. 3 is view similar to FIG. 2, but showing the subirrigation apparatus as assembled for use on the inside of a plant pot.
Figure 4:
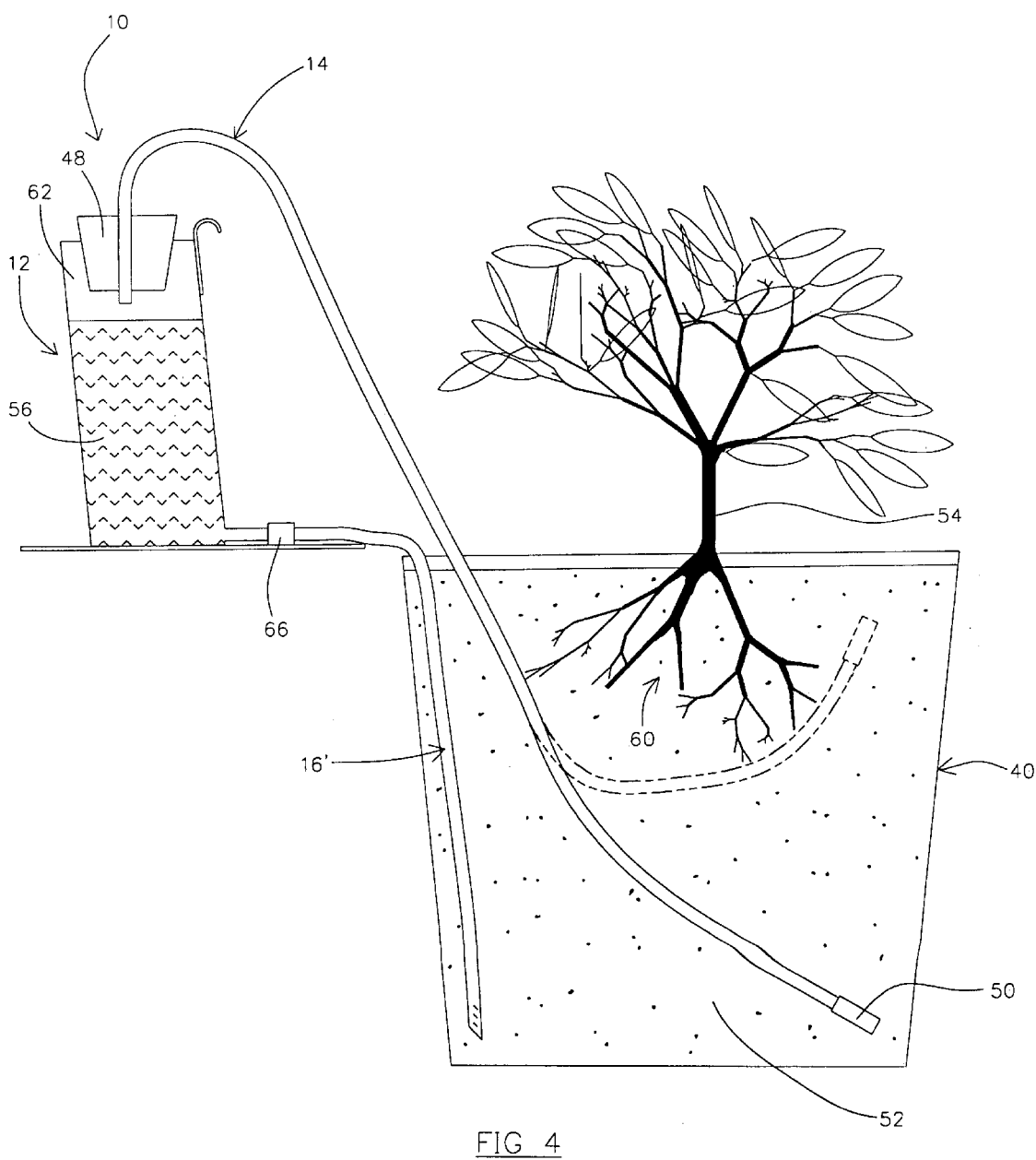
FIG. 4 is a view similar to FIG. 2, but showing an alternative embodiment of the subirrigation apparatus as assembled for use outside and above the top of a plant pot.

Outlet tube 16, like vent tube 14, is comprised of commercially available plastic tubing and projects outwardly from the bottom of reservoir inner wall 30 to selectively deliver a controlled free flow of liquid 56 by gravity to the bottom of plant pot 40 so that the liquid 56 is more directly applied to the root zone 60 of the plant 54. In FIGS. 2 and 3, outlet tube 16 has a short length (1–3 inches) and is adapted to extend radially inwardly into the soil 52 adjacent the bottom of plant pot 40. FIG. 4 represents an embodiment wherein the outlet tube 16 is of longer length, typically 1–12 inches, having an outer end manually disposed near the bottom of plant pot 40.

Referring further to FIG. 2, there is shown an embodiment in which reservoir 12 is mounted outside plant pot 40 such that support hooks 34, 36 engage the rim of plant pot 40 and outlet tube 16 is pushed into an opening formed in the lower peripheral wall 38 of pot 40 so that it lies adjacent the bottom thereof. With reservoir 12 suspended in place, plug 48 is removed so that liquid 56 (i.e. water and/or fertilizer) may be poured into fill opening 20 such that the liquid level lies just below the proximal end 42 of vent tube 14 when plug 48 is replaced. Assuming that the soil 52 in plant pot 40 is dry and that sensor 50 in the distal end 44 of vent tube 14 is manually placed near the bottom of the plant pot 40, liquid 56 will stream out of the outlet tube 16 directly into the bottom of pot 40 beneath the plant root zone 60. Any toxic residues in the soil 52 are pushed upwardly away from the root zone 60. In the meantime, air in the dry soil 52 will flow through the dry sensor 50 and will be transmitted to the space 62 over the descending liquid level in reservoir 12. The liquid 56 escaping from reservoir 12 creates a vacuum which pulls upwardly on the volume of liquid 56 until the liquid distributed in the soil 52 saturates sensor 50 and prevents further airflow therethrough. At this point, a state of equilibrium is reached in which there is no further liquid flow until the vacuum in reservoir 12 is relieved.

Placing the sensor 50 near the bottom of the pot 40 is appropriate for a particular plant 54 requiring drier conditions. However, according to the invention, positioning the sensor 50 at a higher level such as shown in phantom lines of FIG. 2, will enable the irrigation of plant 54 demanding wetter conditions without requiring replacement of the sensor 50. In either case, it should be fully appreciated that the liquid 56 required by the plant 54 is delivered in a controlled stream at the bottom of the plant pot 40 directly to the bottom of the root zone 60 which results in a healthier, stronger plant. This is in complete contrast to the top watering, drip-type irrigation provided by the prior art which heretofore has been ineffective. Sensor 50 is an effective control element which prevents the excessive watering and pooling of liquid 56 at the bottom of pot 40 so that root rot will be prevented.

After a period of time, moisture at the bottom of pot 40 will be evaporated or absorbed in the plant root zone 60. As a result, air will again pass through sensor 50 relieving the vacuum created in reservoir 12 and enable liquid 56 to again be delivered to the bottom of root zone 60. At such time as the sensor becomes saturated, liquid 56 will again be pulled within the reservoir 12 by the created vacuum. Owing to the transparency or translucency of the reservoir 12, one may at an appropriate time simply pull the plug 48 and replenish the liquid content of reservoir 12 as desired. In addition, it is possible to inspect the upper visible portion of the vent tube 14 to make sure it is not clogged with soil and/or moisture.

FIG. 3 shows an alternative embodiment of the invention wherein reservoir 12 is mounted inside the interior wall 64 of an enlarged pot 40 having multiple plants 54. This design is structurally similar as described above with the exception that support hooks 34, 36 project upwardly from the top of reservoir outer wall 32. In this version, the convexly-shaped outer wall 32 of reservoir 12 is disposed against the complementary-shaped inner wall of the pot 40. Use of this design is identical to that described above.

FIG. 4 illustrates another alternative embodiment wherein the reservoir 12 is positioned above and outside of plant pot 40. This design provides an extended outlet tube 16', the distal end which is placed at the bottom of the pot 40. In addition, a one-way check valve 66 is provided in the proximal end of the tube 16' so as to prevent the back flow of any air and liquid into the reservoir 12. Again, use of the apparatus 10 is identical to that described in FIG. 2.

It should now be understood that the apparatus can be easily and reliably used to maintain and nurture any type or size of potted plant 54 without transplanting thereof. Apparatus 10 may be easily installed and removed if it is desired for any reason for cleaning or moving. Unlike the prior art, apparatus 10 is designed to bottom water and/or fertilize one or more plants 54 in manner which enables the plant to flourish. Mobile sensor 50 may be quickly set at various levels in the soil 52 to provide the necessary degree of wetness or dryness for a specific type of plant 54.

While the invention has been described with reference to a preferred embodiment, those skilled in the art will appreciate that certain substitutions, alterations and omissions may be made without departing from the spirit of the invention. According, the foregoing description is meant to be exemplary only, and should not be deemed limitative on the scope of the invention as set forth in the following claims.

I claim:

1. A self-watering potted plant device including a pot having a bottom wall for housing a soil-based live plant, said plant device including a reservoir with a side wall structure for retaining liquid therein, the reservoir being provided with a venting tube having one end attached to the reservoir and another end carrying a sensing device placed in the soil surrounding the plant for detecting the moisture level therein, the improvement wherein:

said reservoir is a one piece construction being entirely separately mounted in the vicinity of the pot; and said reservoir being provided with an outlet tube laterally projecting from said side wall structure of said reservoir for delivering liquid to the plant in response to the sensing device and positionable in the soil adjacent the bottom wall of the pot to directly deliver a free flow of liquid to a bottom portion of the pot in response to the moisture level detected by the sensing device.

2. The improvement of claim 1 wherein said reservoir is held stationary when said sensor device is variably positioned.

3. In a plant pot having a bottom wall and a side wall and having a soil-based live plant therein, a plant subirrigation apparatus for self-watering the soil-based live plant from the bottom thereof, said apparatus comprising:

a closed reservoir having a bottom surface, a top surface and side wall structure for retaining a liquid therein, said top surface being provided with an elongated venting tube having a proximal end removably fastened to said top surface and a distal end embedded in the soil of the plant pot, said distal end carrying a sensor responsive to the level of moisture in the plant pot soil, said sensor being positioned at various levels of the soil controlling the degree of wetness and dryness therein, said side wall structure being formed with an outlet tube disposed in the soil adjacent the bottom wall of the plant pot, said reservoir being filled with liquid and mounted in the vicinity of the plant pot such that when the soil in the plant pot becomes dry, air will pass through said sensor to said proximal end of said venting tube enabling liquid in said reservoir to free flow through said outlet tube and into a lower portion of the soil thereby subirrigating the plant, and when the soil in the plant pot becomes moist, said sensor will prohibit air from flowing therethrough and to said proximal end of said venting tube preventing liquid from flowing through said outlet tube into the lower portion of the soil, wherein said reservoir is adapted to be mounted on a supporting surface above the plant pot.

4. In a plant pot having a bottom wall and a side wall and having a soil-based live plant therein, a plant subirrigation apparatus for self-watering the soil-based live plant from the bottom thereof, said apparatus comprising:

a closed reservoir having a bottom surface, a top surface and side wall structure for retaining a liquid therein, said top surface being provided with an elongated venting tube having a proximal end removably fastened to said top surface and a distal end embedded in the soil of the plant pot, said distal end carrying a sensor responsive to the level of moisture in the plant pot soil, said sensor being positioned at various levels of the soil controlling the degree of wetness and dryness therein, said side wall structure being formed with an outlet tube disposed in the soil adjacent the bottom wall of the plant pot, said reservoir being filled with liquid and mounted in the vicinity of the plant pot such that when the soil in the plant pot becomes dry, air will pass through said sensor to said proximal end of said venting tube enabling liquid in said reservoir to free flow through said outlet tube and into a lower portion of the soil thereby subirrigating the plant, and when the soil in the plant pot becomes moist, said sensor will prohibit air from flowing therethrough and to said proximal end of said venting tube preventing liquid from flowing through said outlet tube into the lower portion of the soil, wherein said reservoir is adapted to be mounted inside the side wall of the plant pot.

5. For use with a plant pot having a bottom wall and a side wall and having a soil-based live plant therein, a plant subirrigation apparatus for self-watering the soil-based live plant from the bottom thereof, said apparatus comprising:

a closed reservoir having a bottom surface, a top surface and side wall structure for retaining a liquid therein, said top surface being provided with an elongated venting tube having a proximal end removably fastened to said top surface and a distal end embedded in the soil of the plant pot, said distal end carrying a sensor responsive to the level of moisture in the plant pot soil, said sensor being positioned at various levels of the soil controlling the degree of wetness and dryness therein, said side wall structure being formed with a laterally projecting outlet tube adapted to be disposed in the soil adjacent the bottom wall of the plant pot, said reservoir being adapted to be filled with liquid and mounted entirely separately in the vicinity of the plant pot such that when the soil in the plant pot becomes dry, air will pass through said sensor to said proximal end of said venting tube enabling liquid in said reservoir to free flow through said outlet tube and be directly delivered into a lower portion of the soil thereby subirrigating the plant, and when the soil in the plant pot becomes moist, said sensor will prohibit air from flowing therethrough and to said proximal end of said venting tube preventing liquid from flowing through said outlet tube into the lower portion of the soil.

6. The apparatus of claim 1, wherein said reservoir is formed of at least a translucent material so that the liquid level therein can be visually monitored.

7. The apparatus of claim 1, wherein said side wall structure of said reservoir is provided with a set of hooks engageable with the side wall of the plant pot.

8. The apparatus of claim 1, wherein said venting tube is flexible enabling said sensor tube to be variously positioned in the plant pot.

9. The apparatus of claim 1, wherein said proximal end of said venting tube carries a plug sealingly engageable with a wall forming an opening in said top surface to make said reservoir airtight.

10. The apparatus of claim 1, wherein said sensor is comprised of a porous filter material.

11. The apparatus of claim 1, wherein said reservoir is mounted outside the side wall of the plant pot.

12. The apparatus of claim 1, wherein said reservoir is mounted on a supporting surface above the plant pot.

13. The apparatus of claim 1, wherein said reservoir is mounted inside the side wall of the plant pot.

14. The apparatus of claim 1, wherein said outlet tube is provided with a one-way check valve.

15. The apparatus of claim 1, wherein the placement of said sensor in an upper portion of the plant pot soil will provide wetter conditions, and the placement of said sensor in a lower portion of the plant pot will provide drier conditions.

16. The apparatus of claim 1, wherein said side wall structure of said reservoir includes a contoured surface which is in mating relationship with the plant pot sidewall when said reservoir is mounted in relation thereto.

17. The apparatus of claim 1, wherein the liquid is a combination of water and a fertilizing agent.

18. A method of subirrigating a pot, the method comprising the steps of:

a). providing a pot having a bottom wall and a side wall for housing a soil based live plant;

b). providing an entirely separate reservoir having a bottom surface, a top surface and a side wall structure for retaining a liquid therein, said reservoir having an elongated venting tube with one end removably fastened to a top surface of said reservoir and another end having a sensing device embedded in the soil surrounding the plant, said reservoir also having an outlet tube projecting laterally from said side wall structure for selectively delivering liquid in the reservoir to the soil;

c). installing said outlet tube adjacent the bottom wall in the pot such that liquid from said reservoir is directly delivered to the bottom of the pot in response to the moisture level detected by said sensing device; and d). positioning said sensing device at a desired level in the soil.

* * * * *